(12) United States Patent
Miller-Smith

(10) Patent No.: US 9,872,219 B2
(45) Date of Patent: Jan. 16, 2018

(54) HANDOVER MECHANISM FOR SENSOR NETWORKS

(75) Inventor: Richard Matthew Miller-Smith, Oxted (GB)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 780 days.

(21) Appl. No.: 12/811,392

(22) PCT Filed: Jan. 8, 2009

(86) PCT No.: PCT/IB2009/050052
§ 371 (c)(1),
(2), (4) Date: Jul. 1, 2010

(87) PCT Pub. No.: WO2009/090575
PCT Pub. Date: Jul. 23, 2009

(65) Prior Publication Data
US 2010/0285807 A1    Nov. 11, 2010

(30) Foreign Application Priority Data

Jan. 11, 2008 (EP) .................................... 08100357

(51) Int. Cl.
*H04W 36/30* (2009.01)
*H04W 84/18* (2009.01)
(Continued)

(52) U.S. Cl.
CPC ........... *H04W 36/30* (2013.01); *H04W 84/18* (2013.01); *H04W 48/04* (2013.01); *H04W 84/005* (2013.01)

(58) Field of Classification Search
CPC ....... H04W 76/02; H04W 4/008; H04W 8/24; H04W 64/003; H04W 4/006;
(Continued)

(56) References Cited

U.S. PATENT DOCUMENTS 7,555,383 B2 *  6/2009  Siegel ........................... 701/519
7,650,158 B2 *  1/2010  Indirabhai ............ H04W 56/00
                                                                 455/41.1
(Continued)

FOREIGN PATENT DOCUMENTS

KR    20060079023 A    7/2006
KR    100786389 B1    12/2007
(Continued)

OTHER PUBLICATIONS

Kim et al: "A Seamless Coordinator Switching (SCS) Scheme for Wireless Personal Area Network"; IEEE Transactions on Consumer Electronics, August 2003, vol. 49, No. 3, pp. 554-560.
(Continued)

*Primary Examiner* — Olumide T Ajibade Akonai

(57) ABSTRACT

Methods and access devices for collecting data from sensors of a wireless sensor network include transmitting a broadcast signal by a master device which currently collects the data and detected by other access devices. Handover of data collection control from the current master access device to an alternate access device is initiated based on a result of the detection. A handover request signal is received at the master device and a handover reply is signaled to a source device of the handover request signal. The handover reply indicates the time at which data collection is handed over from the current master access device to the source device. Thereby, the master device can be changed in a flexible manner based on current environmental conditions.

32 Claims, 5 Drawing Sheets

| Frame Type Beacon 2/3 | BSN ID 16+ | Superframe Seq Number 4+ | Slot ACK | Slot Frame Pending | Superframe Status & Control Fields |
|---|---|---|---|---|---|

(51) Int. Cl.
*H04W 84/00* (2009.01)
*H04W 48/04* (2009.01)

(58) Field of Classification Search
CPC ... H04W 4/025; H04W 84/005; H04W 4/005; H04W 36/0016; H04W 36/30; H04W 84/18
USPC .................................. 455/415, 436; 370/331
See application file for complete search history.

(56) References Cited

U.S. PATENT DOCUMENTS

| | | | |
|---|---|---|---|
| 2003/0220765 A1* | 11/2003 | Overy ................. | H04L 63/0492 702/158 |
| 2005/0059420 A1 | 3/2005 | Salokannel et al. | |
| 2007/0133469 A1* | 6/2007 | Shin ..................... | H04W 40/34 370/331 |
| 2007/0293223 A1* | 12/2007 | Kuwana ........................ | 455/436 |
| 2009/0129341 A1* | 5/2009 | Balasubramanian ...................... | H04W 36/0055 370/331 |

FOREIGN PATENT DOCUMENTS

| | | |
|---|---|---|
| WO | 2005122879 A1 | 12/2005 |
| WO | 2006048840 A1 | 5/2006 |
| WO | 2006102650 A1 | 9/2006 |

OTHER PUBLICATIONS

Takizawa et al: "Wireless Vital Sign Monitoring Using Ultra Wideband-Based Personal Area Networkks"; Proceedings of the 29th Annual International Conference of the IEEE EMBS; Lyon, France, Aug. 2007, pp. 1798-1801.
"802.15.3 IEEE Standard for Information Technology; Part 15.3: Wireless Medium Access Control (MAC) and Physical Layer (PHY) Specifications of High Rate Wireless Personal Area Networks (WPANS)"; IEEE, September 2003, 90 Page Document.
"802.15.4: Wireless Medium Access Control (MAC) and Physical Layer (PHY) Specifications for Low-Rate Wireless Personal Area Networks (WPANs)"; IEEE, 2006, 26 Page Document.
Ye et al: "An Energy-Efficient MAC Protocol for Wireless Sensor Networks"; USC/ISI Technical Report ISI-TR543, Sep. 2001, pp. 1-10.

* cited by examiner

HANDOVER MECHANISM FOR SENSOR NETWORKS

FIELD OF THE INVENTION

The present invention relates to access devices and handover methods for collecting sensor data in sensor networks, such as but not limited to body sensor networks.

BACKGROUND OF THE INVENTION

The benefits of collecting medical information from a person over a long time period and during everyday life have long been prophesised. In recent years, many research groups have been investigating body sensor networks (BSNs). These are networks of multiple sensors or sensing devices or sensing nodes, deployed around, and even in, the body and transmitting their data over a digital radio link. Thus, each sensor should be as discrete and small as possible.

A number of protocols are currently known which purport to be protocols for 'low-power' networks and might therefore be suitable for BSNs. Examples of such protocols are described in "Part 15.4: Wireless Medium Access Control (MAC) and Physical Layer (PHY) Specifications for Low-Rate Wireless Personal Area Networks (LR-WPANs)", IEEE Std 802.15.4-2006, and Wei Ye et al. "S-MAC: An Energy-Efficient MAC Protocol for Wireless Sensor Networks". However, the design of these networks may not be optimal very low power devices, especially if the majority of devices on the network are just collecting data from sensors and are forwarding these readings to a single device.

A BSN, by its very nature, is a mobile network and can be worn on the body, for example. Additionally, an access device or 'collating' device is provided, which collects data from the sensor nodes and which may also be worn on the body. However, it would be advantageous if this portable device could be taken off in certain areas, e.g., while the person wearing the BSN is at home. Also, in order to reduce battery usage of the portable device it would be an advantage if fixed, e.g. mains powered, devices could take over the network.

SUMMARY OF THE INVENTION

An object of the present invention is to provide a more flexible data collection mechanism for body sensor networks or other types of wireless networks.

Accordingly, a 'handover mechanism' is provided, whereby the data collection control in the wireless network can be handed-over from one device to another. Data collection control of a portable device could thus be handed over in certain areas to a fixed and mains-powered device which is connected to a permanent power supply. Moreover, battery usage of the portable device can be reduced when data collection control has been handed over to the fixed device.

According to a first aspect of the proposed solution, the handover control unit or functionality may be arranged to determine a number of successive missing instances of a periodically broadcast signal, e.g. beacon transmissions, and, if the determined number exceeds a predetermined threshold, to initiate the handover by the device itself starting to transmit its own broadcast signal. Thereby, an instantaneous emergency takeover mechanism can be provided in cases where the broadcast signal is temporarily not available.

According to a second aspect, the handover control unit or functionality may be arranged to determine a quality of a detected broadcast signal and to initiate the handover by transmitting a handover request signal to the master device, if the determined quality is higher than a predetermined threshold. This non-instantaneous takeover option is suitable for cases where a priority allocated to the requesting device is higher than a priority allocated to the master device. As an option, the handover control unit or functionality of both access device and master device may be arranged to stop the handover process by transmitting a handover stop signal to the other end, if the determined quality becomes lower than a predetermined threshold. This ensures that data collection control is not handed over to a device with inferior reception quality.

In a specific example, the handover control unit or functionality may be arranged to determine a priority of the master device based on the detected broadcast signal and to initiate the handover by transmitting a handover request signal to the master device, if the determined quality is lower than a predetermined threshold and if the determined priority is lower than a priority allocated to the access device. Thereby, an up-priority takeover can be initiated if the quality of signals received from the master device decreases. As an example, the determined quality may be signaled in the handover request signal.

Furthermore, the handover control unit of the access device with the master function may be adapted to indicate the timing by signaling a number of frames for which it will keep controlling the wireless sensor network. Based on this signaled number, the takeover process can be synchronized, while signaling load is kept low.

In addition, the handover control unit of the master device may be adapted to set a control information in the broadcast signal in response to the receipt of the handover request signal, the control information indicating that handover is imminent. This measure ensures that other access devices are informed about any ongoing handover process.

Moreover, the handover control unit of the master device may be arranged to determine a priority of the source device and to initiate the handover to a source device with highest determined priority, if the determined quality is lower than a predetermined threshold. This priority-based selection ensures that data collection control is handed over to an access or collating device with the highest allocated priority.

Further advantageous embodiments are defined below.

BRIEF DESCRIPTION OF THE DRAWINGS

The invention will now be described, by way of example, based on embodiments with reference to the accompanying drawings, wherein.

DESCRIPTION OF PREFERRED EMBODIMENTS

Various embodiments of the present invention will now be described based on a BSN system as an example of a wireless sensor network.

Figure 1:
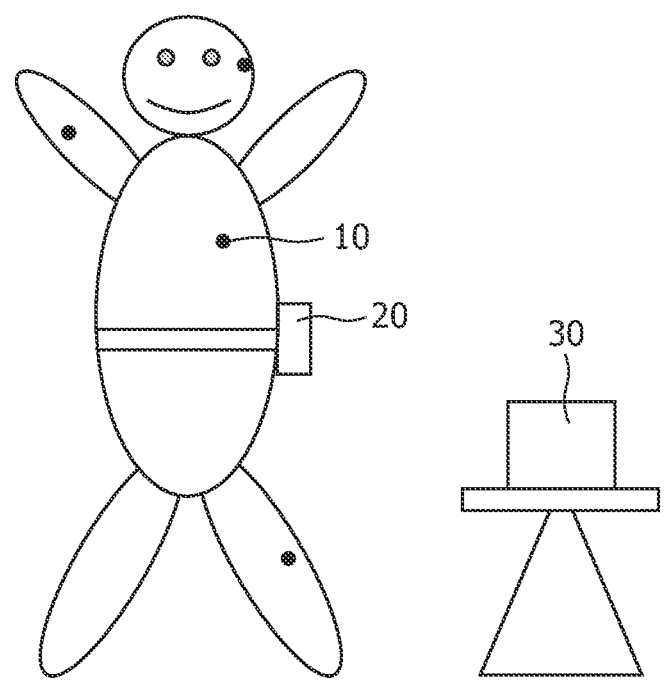
FIG. 1 shows a schematic human body with a sensor network and collating devices.

FIG. 1 shows a schematic diagram of a BSN system with a small number of locations on a body, that might have a sensing node 10 attached. Each node 10 may consist of one or more individual sensor elements (not shown). Besides the nodes 10 located around the body, the BSN system may comprises one or more access or collating devices 20, 30, which receive signals or sensing data from the nodes 10 and which may be configured to upload the received information to a central server (not shown).

In the exemplary arrangement of FIG. 1, a mobile access or collating device 20 is configured to be worn somewhere on the body (e.g. on a belt), and/or may alternatively be integrated into an electronic device, such as a mobile phone, which would be carried anyway. Additionally, a fixed access or collating device 30 may be located in specific areas (e.g. at home, for example in the lounge and bedroom), which can be powered from the mains and which is configured to collect data whilst the user is located in the vicinity thereof.

Different types of sensors may be provided in the nodes 10. E.g., a sensor for sensing a temperature of a body region where it is attached to. A person may wear one or more of these—to measure the temperature on/in the body both on the torso and at the extremities. Additionally, a sensor may be provided for sensing oxygen saturation of the blood, which is usually measured through the skin by detecting the 'redness' of the blood. Another type of sensor may be worn to detect the movement and level of activity of the wearer. Research has shown that this can also allow the current activity (sitting, walking, running etc.) to be inferred. Another sensor may be provided to measures an electrical signal generated as the heart beats, by reading the differential voltage at the skin across the heart. Still other sensor may detect a rate of breathing and coughs, a number of steps taken (pedometer), a blood pressure, either using traditional 'cuff' mechanism, or by using timing information between a heartbeat and arrival of the pulse at an extremity.

The BSN nodes 10 may comprise at least one sensor element, electronics and a power source, which should be very small and, where possible, flexible and comfortable to wear. However, a reason for bulky dimensions of current sensors is the power source. This is usually some type of watch battery, either a silver-zinc button cell, or flat coin-shaped lithium cell. Such batteries have both a low capacity and a limit on the peak current that can be drawn. An RC circuit may be employed to reduce the peak current of the radio circuit.

The BSN system requires a device that can receive the transmissions from the BSN nodes 10. It may also need to control the system, change settings in devices or reconfigure the network.

These tasks may be performed by the mobile collating device 20 (which could be embedded in a device such as a mobile phone). The collating device 20 can be battery powered, wherein the batteries should have a reasonable capacity and should be easy to replace or to recharge.

The fixed collating device 30 may be located in areas where the user spends a lot of time (such as a lounge, bedroom or workplace). These devices will probably be mains powered, or have a large capacity battery that can power the device for a long period.

The collating devices 20, 30 are configured to gather together information from the BSN nodes 10. Depending on the type of BSN system the collating devices 20, 30 may then process the received information, store it (for later uploading) or forward it to a central server (via broadband or GSM link, for example).

Figures 2, 3:
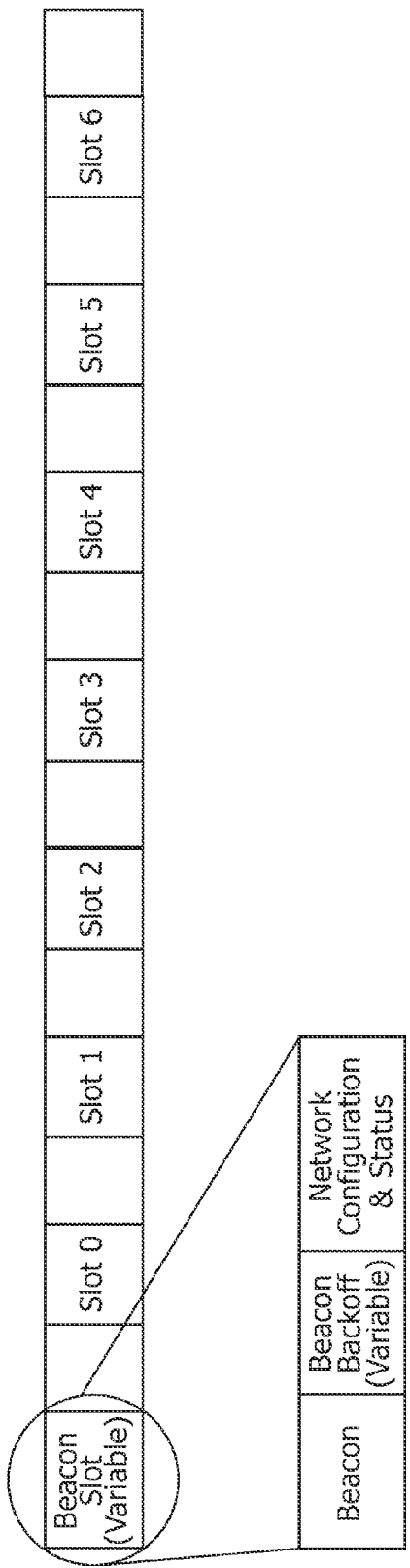
FIG. 2 shows an exemplary superframe structure according to an embodiment.
FIG. 3 shows an exemplary structure of beacon data according to an embodiment.

FIG. 2 shows an exemplary superframe structure example for signal transmission within the BSN system. Time is split into 'superframes', each one starting with a beacon, which is transmitted during a beacon slot by the current master collating device (MCD), which is a collating device to which data collection control and other network control functions have been allocated. In order to reduce collisions between multiple networks on a single channel, superframes may have a variable length.

As indicated in FIG. 2, the superframe is split into multiple regions, each region consisting of a 'slot', in which the radio channel may be used by one of the nodes 10 on the network, and a period of dead time, in which no broadcast shall be made by any node 10 on the network. The number of regions/slots and the ratio of slot to dead time are dependent on the network configuration in use.

The first slot is always used by the current MCD to broadcast a beacon, indicating the start of the superframe. The beacon acts as a timing master for all devices on the network. As will be explored below, a beacon actually consists of multiple parts, allowing devices to sleep for long periods, but still be confident in resynchronising with the network after waking. Optionally, network configuration and status information may be broadcast within the beacon slot.

The first slot may have a variable length (hence changing the length of each superframe)—meaning multiple networks on the same channel should have a constantly altering phase between them. The length of the slot is derived from an algorithm that uses a BSN identity (ID) and a sequence number extracted from the beacon.

The other slots are used for bi-directional data exchange between the MCD, e.g. variable or fixed collating devices 20, 30 in FIG. 1, and the nodes 20. Except for network management functions, only one device may be allowed to transmit in each slot.

The transmission protocol underlying the transmissions may be designed to be used at the Medium Access Control (MAC) level and may be agnostic with respect to the underlying physical radio data link.

FIG. 3 shows an exemplary structure of a beacon frame with beacon data which is transmitted at the start of each superframe. Within each beacon frame a superframe sequence number (SFSN) is provided, which will be limited to a certain number of bits (for example, seven bits). Its value will increase by one in each successive superframe, except when it wraps around to zero. Within each superframe this sequence number is used to control which device is assigned to each slot. The beacon is transmitted in the beacon slot. The beacon contains information relating to the current superframe—this is all contained within the beacon data. As will be described below the beacon may contain this data multiple times.

A frame type information is used to verify that the frame is a beacon frame. This value shall be set to the same value for all beacon frames. Furthermore, the above BSN ID is used to differentiate between different networks on the same channel. It should have a length suitable to differentiate multiple network networks, probably in the order of 16 bits. The above superframe sequence number can also be used to ensure that the device is attached to the correct network. An additional slot acknowledgement (ACK) may be provided as a bitfield or flag (e.g. one bit per slot), within which the bits are set to one if at least one frame was correctly received from a device within the corresponding slot in the previous superframe. Additionally, a slot frame pending bitfield (e.g. one bit per slot) may be provided, within which the bits are set to one if the MCD is going to transmit a frame within the corresponding slot. Finally, some superframe control and status fields may be provided as optional fields which are not discussed here.

Depending on the configuration of the network the slot ACK and slot frame pending fields also can be optional. This is only the case if a device can easily predict from the sequence number and its knowledge of the network whether a superframe is used for transmission or reception only.

The nodes 10 may not need to transmit or receive data for long periods, and hence may not listen for the beacon of every superframe, instead they may enter a low-power state for multiple superframe periods. Whilst in this low-power state a node 10 may loose synchronisation with the exact timing of the beacon transmission of the superframe, as no accurate timing source may be available in this state. When the node awakes and listens for the beacon then it may wake too late, missing all or part of the beacon data, or it may wake too early, requiring it to listen for longer than should be necessary (and hence using more power). These problems are solved by the beacon consisting of multiple repeats of the beacon data, embedded in beacon data packets. The nodes 10 aim to receive a single copy of the beacon data—usually the copy in the central packet (for example if the data is repeated 5 times, the node will aim to hear the $3^{rd}$ copy). Then if the node wakes early or late it is much more likely to be able to quickly and correctly receive the beacon data. Moreover, if the start of each copy of the beacon data packet is identified, and the reception of this start is timed accurately, then the original timing of the beacon transmission can easily be reconstructed and used to synchronise in the current and future superframes. The multiple transmissions of the beacon data also provide a large amount of error resilience. A node 10 can detect that a received beacon data is corrupt (e.g. by means of a cyclic redundancy check (CRC) or another error check), but can continue to receive the transmitted beacon data packets until a fully correct beacon data packet is received.

An association command may be used by a device, which is not currently a node on the network, to request that the MCD assigns an address to it. The association request may include the BSN ID of the network the device wishes to join, the device address of the node 10 (which could be, for example, a 64-bit IEEE address), and a single bit indicating whether the device is capable of being a collating device. Also included may be a number of fields indicating the required bandwidth and latency requirements of the node 10. When the command is received by the MCD it must use this information, together with the network configuration settings, to try and assign an address to the device. If the network is not capable of supporting the required latency and bandwidth, the association reply may include an error code. If the network is capable, but all addresses are in use another type of error code may be used. It is up to the joining device whether it wishes to request association on the network with lesser requirements. An association reply is sent in response to an association request, wherein an error code may be used to indicate a successful request. The association reply may also contain the BSN ID and device address which were contained in the association command.

In the embodiment, a takeover or handover mechanism is provided, so that the MCD can be changed. This change could be done for example from the battery powered mobile collating device 20 to the fixed collating device 30 shown in FIG. 1.

It is now assumed that the mobile collating device 20 is the current MCD. The proposed handover mechanism enables that the collating devices 20, 30 can work out which is more suitable for current use, and if they should change. Moreover, the proposed handover mechanism ensures that a collating device can take over the network when the signal quality to/from the current MCD drops below a threshold. This could happen when a person wearing the mobile collating device 20 moves away from a fixed MCD.

In the following, two mechanisms for a collating device to take over a network are described based on respective embodiments. The first mechanism is 'handover' which is mutually agreed between the current MCD and the new MCD—this is done over a period of time, which should ensure that the wearer is relatively static (for example not walking in/out of a room frequently). The second mechanism, MCD startup or network takeover, is used when a potential CD detects no beacon and hence needs to step in quickly to maintain the network and continue the collation of data.

In the embodiments, a priority level may be allocated to each collating device. This provides additional information as to which device should be the MCD. The priority value given to a CD can be based on the capabilities of the device's power supply, the maximum radio transmit power and the sensitivity of the collating device's radio receiver. Of course, other parameters may be used as well. The priority can be represented by a binary number (e.g., 6 bits, but the length may also alter). Table 1 below shows some example priorities:

TABLE 1

| CD Description | Priority |
| --- | --- |
| Small, lightweight wearable device. Small rechargeable battery. Standard radio, single aerial. | 10 |
| Mobile phone sized device. Larger rechargeable battery. Standard radio, antenna diversity. | 20 |
| Mains powered device. High sensitivity radio, single aerial. | 40 |
| Mains powered device. High sensitivity radio, antenna diversity. | 50 |

In a network that is handover capable, the MCD may transmit a MCD status packet in the network configuration and status period of the above beacon slot structure of FIG. 2. This MCD status may include the priority of the current MCD (possibly along with other information such as MCD battery level).

Figure 4:
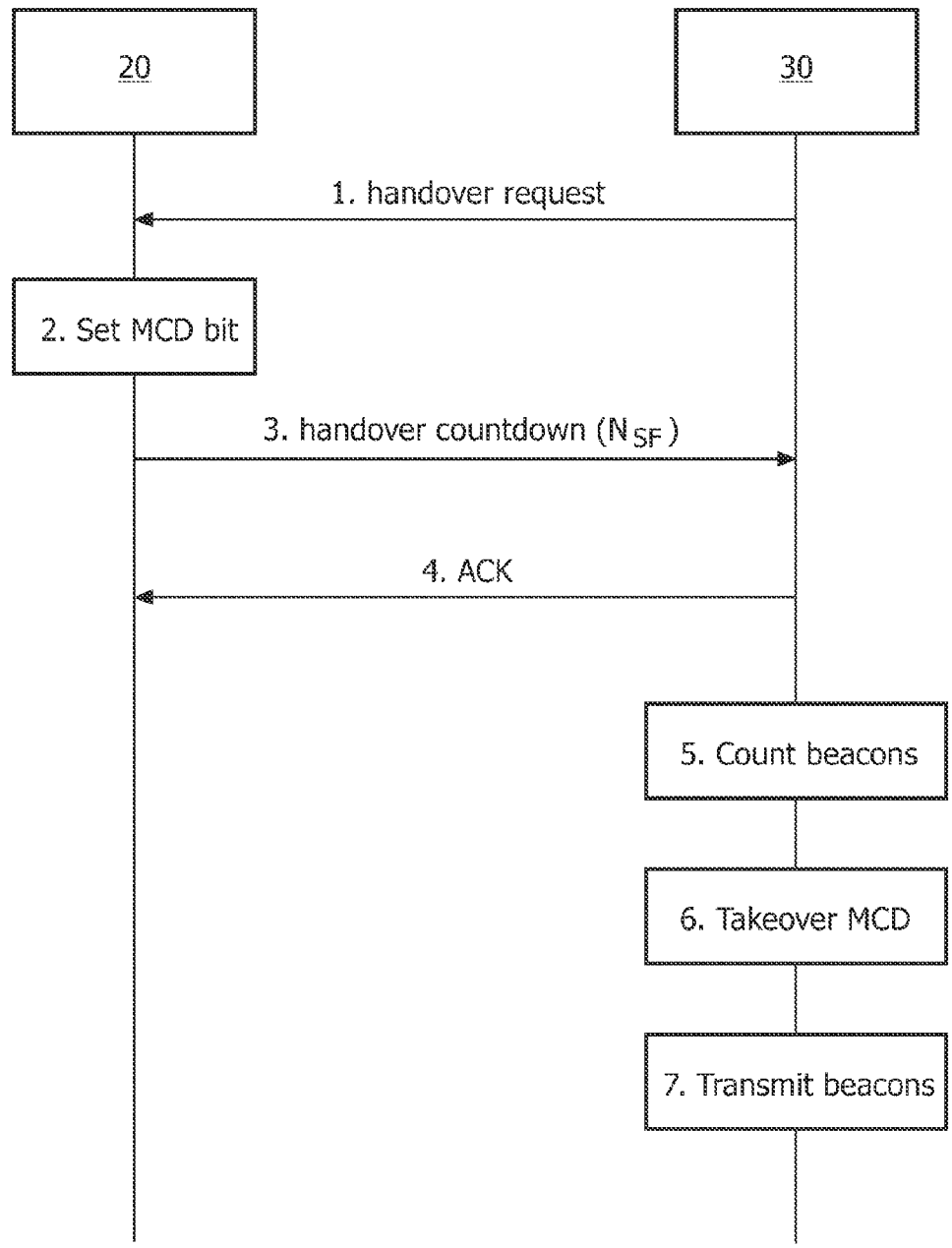
FIG. 4 shows a schematic signaling diagram of an up-priority handover procedure according to an embodiment.

FIG. 4 shows a signaling diagram of a handover procedure from the mobile collating device 20 to the fixed collating device 30 of FIG. 1 according to an embodiment. The fixed collating device 30 may continuously listen and attempt to synchronise with the network (a specific BSN ID). Once it has synchronised to the network it will listen both for the current beacon and for the MCD status packet transmitted by the mobile collating device 20 with MCD functionality.

If the priority of the fixed collating device 30 is higher than the priority of the mobile collating device 20 (current MCD) and the MCD bit in the beacon superframe status and control fields is zero (indicating that at the moment, no other handover is taking place), the fixed collating device 30 can start a up-priority handover process. This process is designed to be non-instantaneous, i.e. the handover process takes some time to be acted upon, with the radio signal quality in both directions being monitored throughout the process. This should minimise the number of handovers, especially when a person is mobile and walking past the fixed collating device 30.

If the fixed collating device 30 is not associated with the network, it should associate with it, e.g. with a maximum level and a ratio of one. The fixed collating device 30 monitors the signal quality of the beacon, and if the signal quality is above a certain threshold, it sends in step 1 a handover command or request to the MCD (i.e. mobile collating device 20).

The mobile collating device 20 processes the request, if it has no other handover process pending, and set in step 2 the MCD bit in the superframe status and control field of the beacon which it transmits as long as it remains the MCD. Additionally, it returns a handover countdown reply in step 3 to fixed collating device 30.

The handover countdown reply contains a number $N_{SF}$, which represents the number of superframes for which the mobile collating device 20 will remain the MCD (i.e. a countdown to the point or timing of handover). In response to the receipt of this reply, the fixed collating device 30 sends an acknowledgement (ACK) in step 4.

The mobile collating device 20 may transmit such a handover countdown reply or frame in each allocated slot before the handover, and the fixed collating device 30 may then acknowledge each countdown reply frame.

Optionally, if at any time before the handover, the current MCD (i.e. mobile collating device 20) decides that the signal quality has gone below a threshold, then it may stop the handover process by sending a handover stop frame and clearing the MCD bit in the superframe status and control field.

As a further option, if at any time before the handover, the fixed collating device 30 decides that the signal quality is lower than a threshold it may send a handover stop frame. It may keep sending this frame until it receives an acknowledgement, the MCD bit in the beacon frame goes to zero, or the signal is totally lost.

In step 5, the fixed collating device 30 counts the beacon frames and at the point of handover, it takes over the role as MCD in step 6 and will now start to transmit the beacons in step 7. the mobile collating device 20 becomes a node on the network (with the address originally assigned to it). If no data is to be sent between the mobile collating device 20 and the new MCD (i.e. the fixed collating device 30), and the mobile collating device 20 does not wish to have the network handed back to it, then it can disassociate from the network (while it may still listen for the beacons). In general, it may be advantageous if a wearable portable collating device is not disassociated from the network, as it may need to take over the role of the MCD again.

Figure 5:
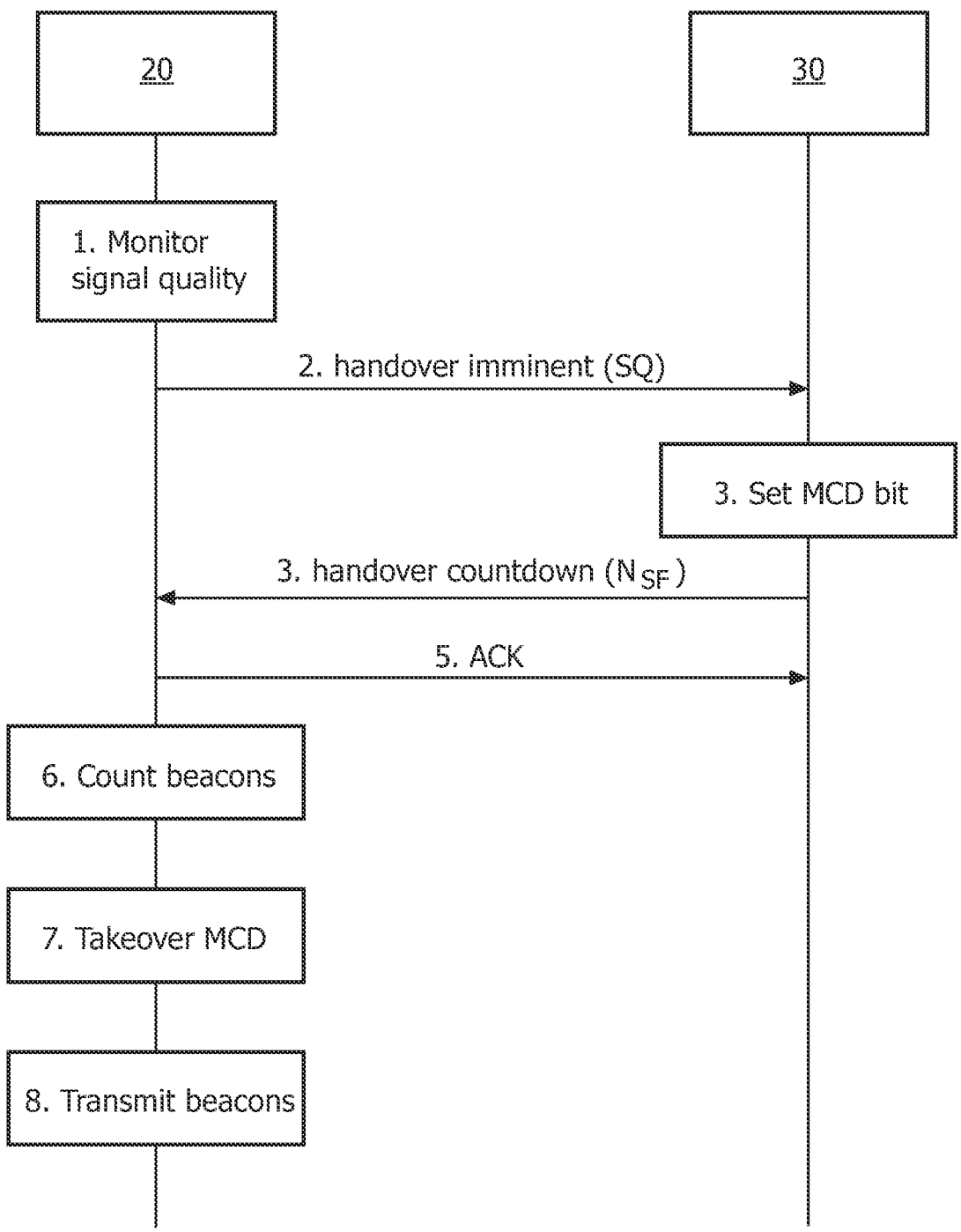
FIG. 5 a schematic signaling diagram of a down-priority handover procedure according to an embodiment.

FIG. 5 shows a signaling diagram of a handover procedure from the fixed collating device 30 to the mobile collating device 20 of FIG. 1 according to another embodiment. Such a handover to the mobile collating device 20 with lower priority will usually occur when the person moves away from the fixed collating device 30 whilst wearing the mobile collating device 20. This implies that the handover process should be initiated by a decrease in signal quality, and the process should take place relatively quickly to ensure that as little data as possible is lost.

It is assumed that the mobile collating device 20 is associated on the network—but not the MCD. In step 1 of FIG. 5, the mobile collating device 20 and all other collating devices currently associated on the network (e.g. possible other collating devices not shown in FIG. 1) monitor the signal quality of the beacons transmitted by the MCD (which is now the fixed collating device 30). If the signal quality drops below a threshold value, then the mobile collating device 20 transmits in step 2 a handover request (e.g. handover imminent command) to the MCD. This handover request may include information indicating the signal quality SQ at the mobile collating device 20.

The MCD (fixed collating device 30) may monitor the signal quality to and from the nodes 10 on the network and also the signal quality of any frames received from the mobile collating device 20—including any handover requests.

If the signal quality monitored by the MCD (fixed collating device 30) drops below a threshold value, then it sets in step 3 the MCD bit in the beacon's superframe control and status field and sends in step 4 a countdown command to the requesting mobile collating device 20 (or any other collating device with the highest priority associated on the network). The countdown command may include a value $N_{SF}$ indicating the number of superfames for which the fixed collating device 30 will remain the MCD. The value used may be fixed, or may be dependent on the current signal quality or change in signal quality.

In step 5, the mobile collating device 20 acknowledges the countdown command in the next allocated time slot. Further handover countdown commands may be sent in the next allocated time slots until the point of handover. These commands may each be acknowledged by the mobile collating device 20.

Optionally, if at any time before the handover, the current MCD decides that the signal quality has gone back above threshold then it shall stop the handover process by sending a handover stop frame and clearing or resetting the MCD bit in the superframe status and control field of the beacon.

As an additional option, if at any time before the handover, the mobile collating device 20 decides that the signal quality is lower than a threshold it can send a handover stop frame. It should keep sending this frame until it receives an acknowledgement, the MCD bit goes to zero, or the signal is totally lost.

The mobile collating device 20 counts the beacon frames in step 6 and at the point of handover, it takes over the role as MCD in step 7 and starts in step 8 to transmit the beacons. Thus, the fixed collating device 30 now becomes a node on the network (with the address originally assigned to it). If no data is to be sent between the fixed collating device 30 and the new MCD and it does not wish to have the network handed back to it, then the fixed collating device 30 may disassociate from the network (but it may still listen for the beacons).

However, if no collating device is associated as a node on the network, then the current MCD needs to attract any capable device to quickly associate. This can be achieved by setting the optional 'CD Attract' bit of the beacon's superframe status and control field. This bit is set if the signal quality of the data received from the network falls below a threshold value. When at least one collating device is assigned to the network, then the above process of FIG. 5 can be used.

In the following, an MCD emergency takeover case is described. Here, a collating device which is not the MCD listens for the beacons transmitted from the current MCD. Suddenly, the MCD stops beacon transmission for multiple superframes (e.g. due to power failure). This problem can be solved by having the available collating devices listen to the beacons from the MCD and when more than a threshold value, M, of consecutive beacons are not heard, then the respective collating device may initiate the MCD emergency takeover process. The concerned collating device which detected the missing beacons waits a certain number, N, of superframes. The value of N is dependent on the priority of the concerned collating device, e.g. the higher the priority the lower the value of N. This ensures that the highest priority collating device shall start transmitting beacons first. After this waiting period, the concerned collating device starts transmitting beacons, synchronised (as far as possible) with the original beacon transmission.

Figure 6:
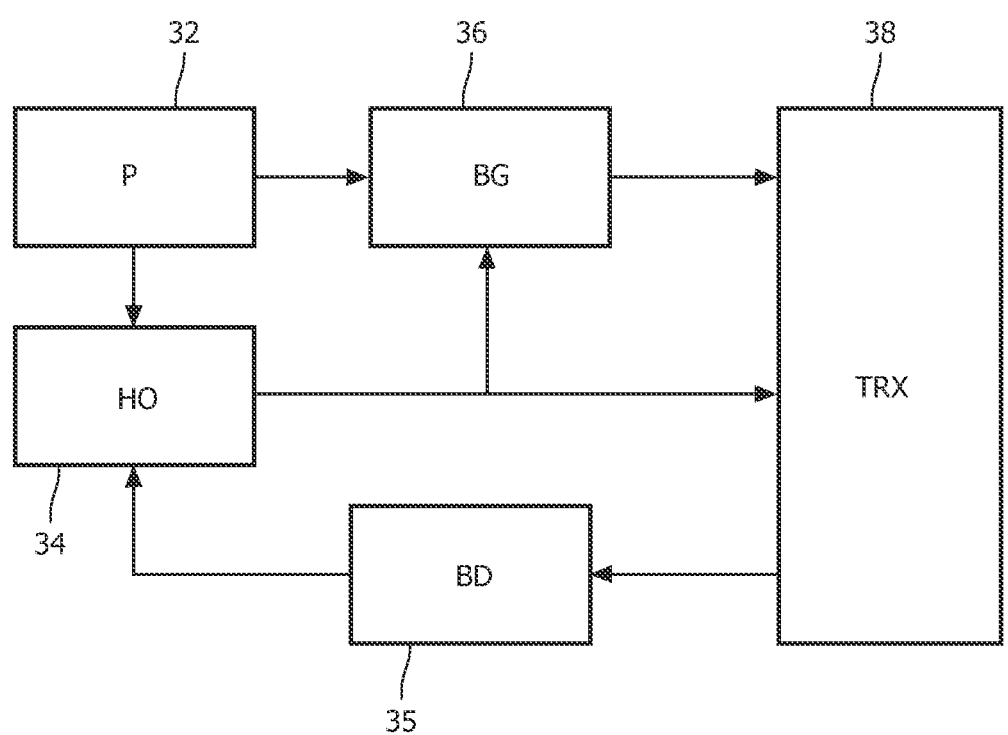
FIG. 6 shows a schematic block diagram of an access device according to an embodiment.

FIG. 6 shows a schematic block diagram of a collating device, such as the mobile or fixed collating devices 20, 30 of FIG. 1.

A transceiver unit (TRX) 38 is provided to enable transmission and reception of radio frequency (RF) signals to/from the network. When a beacon is detected or monitored at a beacon detector 35, a quality and priority information is derived and forwarded to a handover control functionality or unit 34. Additionally, a priority setting functionality or unit 32 is provided to enable a user or the network to set a priority which has been allocated to the collating device. Based on the received signal quality and a comparison between the priority signaled in the received beacon, the handover control unit 34 generates handover signaling in accordance with the signaling diagrams of FIGS. 4 and 5 and the above description of the possible handover mechanisms for different scenarios. Additionally, a beacon generation functionality or generator unit 36 is provided in the collating device of FIG. 6. The generator unit 36 generates beacons e.g. in accordance with FIG. 3 and forwards these beacons to the TRX 38 for broadcasting them within to the network.

It is however noted that the configuration of FIG. 6 is only an example of how the system can be built. An equivalent setup could also be obtained with different building blocks or, after an analog-to-digital (A/D) conversion, in the digital domain and thus also on the basis of software routines.

The above embodiments can be implemented as well in body-coupled or body-based systems in many domains, or in other wireless networks where sensor data can be collected at different fixed or mobile locations.

In summary, methods and access devices for collecting data from a plurality of sensors 10 of a wireless sensor network have been described, wherein a broadcast signal is transmitted by a master device which currently collects the data, and wherein handover of data collection control from the current master access device to an alternate access device is initiated based on a result of the detection. The handover request signal is received at the master device and a handover reply is signaled to a source device of the handover request signal, the handover reply indicating the time at which data collection is handed over from the access device to the source device. Thereby, the master device can be changed in a flexible manner based on current environmental conditions.

While the invention has been illustrated and described in detail in the drawings and the foregoing description, such illustration and description are to be considered illustrative or exemplary and not restrictive. The invention is not limited to the disclosed embodiments. From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. A single processor or other unit may fulfill the functions of blocks 32, 34, 35 and 36 of FIG. 6, based on corresponding software routines. The computer program may be stored/distributed on a suitable medium, such as an optical storage medium or a solid-state medium supplied together with or as part of other hardware, but may also be distributed in other forms, such as via the Internet or other wired or wireless telecommunication systems. The mere fact that certain measures are recited in mutually different dependent claims does not indicate that a combination of these measures cannot be used to advantage. Any reference signs in the claims should not be construed as limiting the scope thereof.

The invention claimed is:

1. A system for data collection from a plurality of mobile sensors connected in a wireless network, the system comprising:
   a stationary master device powered by mains;
   a mobile master device powered by a battery for data collection from a plurality of mobile sensors and having a detector for detecting a broadcast signal from the stationary master device; and
   a control unit for handover of data collection from the mobile master device to the stationary master device based on the quality of the detected broadcast signal, the quality indicating that the mobile master device is in a vicinity of the stationary master device allowing the data collection by the stationary master device when the mobile master device is in the vicinity of the stationary device.

2. The system according to claim 1, wherein the control unit is configured to determine a number of successive missing instances of the broadcast signals from the stationary master device and to initiate the handover from the stationary master device to the mobile master device including transmitting a broadcast signal by the mobile master device, when the determined number exceeds a predetermined threshold.

3. The system of claim 1, wherein the control unit is configured to determine a quality of the detected broadcast signal of the stationary master device and to initiate the handover of data collection to the mobile master device by transmitting a handover request signal to the stationary master device when said the quality is lower than a predetermined threshold.

4. The system of claim 3, wherein the control unit is configured to stop the handover of data collection from the mobile master to the stationary master by transmitting a handover stop signal to the stationary master device when the determined quality is lower than a predetermined threshold indicating that the mobile device is not in the vicinity of the stationary device.

5. The system of claim 3, wherein the control unit is configured to determine a priority of the mobile master device and to initiate the handover to the stationary master device of data collection by transmitting a handover request signal to the stationary master device when the determined quality is lower than a predetermined threshold and if the determined priority is lower than a priority allocated to the mobile device.

6. The system of claim 5, wherein the control unit is configured to indicate the determined quality in the handover request signal.

7. The system of claim 1, wherein the mobile master device is configured to transmit a handover countdown signal including an indication of a timing of the handover of data collection to the stationary master.

8. The system of claim 1, wherein the mobile master device is configured to transmit a handover countdown signal including a number of frames the mobile master device will continue the data collection until the handover of data collection to the stationary master.

9. A system for data collection from a plurality of mobile sensors connected in a wireless network, the system comprising:
   a stationary master device powered by mains; and
   a mobile master device powered by a battery for the data collection from the plurality of mobile sensors and having a receiver for receiving a request signal for handover of the data collection from the stationary master device; and
   a control unit for issuing a reply signal to the stationary master device for the request signal, the reply signal indicating a timing at which to transfer the data collection to the stationary master device, wherein the control unit is configured to handover the data collection from the mobile master device to the stationary master device based on the quality of a detected signal, the quality indicating that the mobile master device is in a vicinity of the stationary master device for the data collection by the stationary master device when the mobile master device is in the vicinity of the stationary master device.

10. The system of claim 9, wherein the control unit is configured to indicate the timing by signaling a number of super-frames for which to maintain the data collection from the wireless mobile sensor network.

11. The system of claim 9, wherein the control unit is configured to broadcast control information in response to the receipt of the request signal, the control information indicating that handover of the data collection from the mobile to the stationary master device, is imminent.

12. The system of claim 9, wherein the control unit is configured to stop the handover of the data collection to the stationary master device, by transmitting a stop signal to the stationary master device when a signal quality of the request signal is determined to be lower than a predetermined threshold indicating that the mobile master device is not in the vicinity of the stationary master device.

13. The system according to claim 9, wherein the control unit is configured to determine a priority of the stationary master device and the mobile master device, and to initiate the handover of the data collection to the master device with highest determined priority when the determined quality is lower than a predetermined threshold.

14. The system of claim 9, wherein the plurality of sensors are attached to a subject and includes:
   a temperature sensor for sensing a temperature of the subject,
   an oxygen sensor for sensing oxygen saturation of a blood of the subject,
   an activity sensor for detecting movement and level of activity of the subject,
   a heart-beat sensor for measuring an electrical signal generated as a heart of the subject beats by reading the differential voltage at a skin of the subject across the heart,
   a breathing sensor for measuring a rate of breathing and coughs,
   pedometer for measuring a number of steps taken by the subject, and
   a blood pressure for measuring the blood pressure of the subject using timing information between a heartbeat and arrival of a pulse at an extremity of the subject.

15. A method of operating a mobile master device for controlling and data collection from a plurality of sensors in a wireless network, the method comprising the acts of:
   controlling and collecting by a mobile master device powered by a battery, data from a plurality of sensors;
   detecting by the mobile master device via a receiver a broadcast signal transmitted by a stationary master device which is configured for controlling and collecting the data; and
   transferring by the mobile master device, data collection from the mobile master device to the stationary master device based on a quality result of detecting act indicating that the mobile master device is in a vicinity of the stationary master device for the data collection by the stationary master device when the mobile device is in the vicinity of the stationary master device.

16. A method of operating a stationary master device for controlling and data collection from a plurality of mobile sensors in a wireless network, the method comprising the acts of:
   collecting by a stationary master device powered by mains, via a receiver, data from the plurality of sensors;
   detecting by the stationary master device, a request signal for transferring the data collecting, to a mobile master device powered by a battery;
   signaling a reply to the mobile master device issuing the request signal, the reply indicating a timing at which the data collecting is handed over from the stationary master device to the mobile master device;
   detecting by the mobile master device, a broadcast signal transmitted by the stationary master device, which is configured for the data collecting; and
   transferring by the mobile master device, the data collecting from the mobile device to the stationary device, based on a quality result of the act of detecting by the mobile master device the broadcast signal indicating that the mobile master device is in a vicinity of the stationary master device for the data collecting by the stationary master device when the mobile master device is in the vicinity of the stationary master device.

17. A computer readable medium that is not a transitory propagating signal or wave, comprising computer instructions embodied in hardware which, when in communication with mobile master device controls the mobile master device to perform the acts of:
   collecting data by a mobile master device powered by a battery, from a plurality of sensors connected in a wireless sensor network;
   detecting by the mobile master device a broadcast signal transmitted by a stationary master device which is configured for collecting the data, the stationary master device is powered by mains; and
   transferring by the mobile master device, data collection from the mobile master device to the stationary master device based on a quality result of the detecting act indicating that the mobile master device is in a vicinity of the stationary master device for the data collection by the stationary master device when the mobile master device is in the vicinity of the stationary master device.

18. An mobile master for traveling with, controlling, and collecting data from, a plurality of mobile sensors in a wireless mobile network, the mobile master comprising:
a battery power source;
a. transmitter configured to transmit control and data signals including signals to control a plurality of mobile sensors in a wireless mobile network;
a receiver configured to receive control signals and data including data from the plurality of mobile sensors in the wireless network;
a detector configured to detect via the receiver, the quality of broadcast signals from a second master, the quality indicating the distance to the changing location of the mobile network;
a handover control unit configured to send a control signal via the transmitter, to the second master to:
initiate handover of control and data collection for the plurality of mobile sensors, from the mobile master to the second master, depending on the detector detecting higher quality broadcast signal of the second master based on a predetermined threshold, and initiate handover of control and data collection for the plurality of mobile sensors, from the second master to the mobile master depending on the detector detecting lower quality broadcast signal of the second master based on a predetermined threshold.

19. The mobile master of claim 18, wherein the handover control unit is configured to determine the quality of the broadcast signals of the second master by determining a number of successive missing instances of the broadcast signals, and to initiate the handover by transmitting a broadcast signal, if the determined number exceeds a predetermined threshold.

20. The mobile master of claim 18, wherein the handover control unit is configured to determine a quality of the detected broadcast signal and to initiate the handover by transmitting a handover request signal to the second master, when the determined quality is higher than a predetermined threshold.

21. The mobile master of claim 20, wherein the handover control unit is configured to stop the process of handover to the second master, by transmitting a handover stop signal to the second master, when the determined quality becomes lower than a predetermined threshold.

22. The mobile master of claim 20, wherein the handover control unit is configured to determine a priority of the master device based on the detected broadcast signal and to initiate the handover by transmitting a handover request signal to the master device, when the determined quality in lower than a predetermined threshold and the determined priority in lower than a priority allocated to the mobile master.

23. The mobile master of claim 22, wherein the handover control unit is arranged to indicate the determined quality in the handover request signal.

24. An mobile master for traveling with, controlling, and collecting data from, a plurality of mobile sensors in a wireless mobile network, the mobile master comprising:
a battery power source;
a transmitter configured to transmit control signals and data including signals to control a plurality of mobile sensors in a wireless network;
a receiver configured to receive control signals and data including data from the plurality of mobile sensors in the wireless network;
a detector configured to detect via the receiver, handover request signals from a second master;
depending on a quality of the handover request signals indicating distance, handover control unit configured to send a control signal via the transmitter, to the second master to indicate a handover and the timing of the handover to:
initiate handover of control and data collection for the plurality of mobile sensors, from the mobile master to the second master, depending on a detected handover request signal from the second master requesting handover of control and data collection for the plurality of mobile sensors, from the mobile master to the second master, and
initiate handover of control and data collection for the plurality of mobile sensors, from the mobile master to the second master, depending on a detected handover request signal from the second master requesting handover of control and data collection for the plurality of mobile sensors, from the mobile master to the second master.

25. The mobile master of claim 24, wherein the handover control unit is configured to indicate the timing by signaling via the transmitter, a number of super-frames for which the mobile master will keep controlling the wireless sensor network.

26. The mobile master of claim 24, wherein the handover control unit is configured to send control information in the broadcast signal via the transmitter, in response to the receipt of the handover request signal, the control information indicating that handover is imminent.

27. The mobile master of claim 24, comprising a quality unit configured determine the quality of the signals received from the second master, and wherein the handover control unit is configured to stop the handover process by transmitting a handover stop signal via the transmitter, to the second master, if the quality of the signals received from the second master is determined to be lower than a predetermined threshold.

28. The mobile master of claim 24, wherein the handover control unit is configured to determine a priority of the second master and to initiate the handover to the second master with highest determined priority, if the determined quality is lower than a predetermined threshold.

29. A second master for intermittent communication with, controlling, and collecting data from, a plurality of sensors in a mobile wireless network, the second master comprising:
a connection for a distributed power system;
a transmitter configured to transmit control signals and data including signals to control a plurality of mobile sensors in a wireless network;
a receiver configured to receive control signals and data including data from the plurality of mobile sensors in the wireless network;
a detector configured to detect via the receiver, a quality of broadcast signals from a mobile master, the quality indicating distance to the mobile master;
depending on a quality of the signals from the mobile master, handover control unit configured to send a control signal via the transmitter, to the mobile master to:
initiate handover of control and data collection for the plurality of mobile sensors, from the mobile master to the second master, and initiate handover of control and data collection for the plurality of mobile sensors, from the second master to the mobile master.

30. An mobile master for traveling with, controlling, and collecting data from, a plurality of mobile sensors in a wireless network, the mobile master comprising:
- a battery power source;
- a transmitter configured to transmit control signals and data including signals to control a plurality of mobile sensors in a wireless network;
- a receiver configured to receive control signals and data including data from the plurality of mobile sensors in the wireless network;
- a detector configured to detect via the receiver, handover request signals from a second master of a different type than the mobile master, and a quality of the handover request signals;
- a handover control unit configured to send, depending on the quality of the request signal, a control signal via the transmitter, to the second master to indicate a handover and the timing of the handover to:
  - initiate handover of control and data collection for the plurality of mobile sensors, from the mobile master to the second master, depending on a detected handover request signal from the second master requesting handover of control and data collection for the plurality of mobile sensors, from the mobile master to the second master, and
  - initiate handover of control and data collection for the plurality mobile sensors, from the mobile master to the second master, depending on a detected handover request signal from the second master requesting handover of control and data collection for the plurality of mobile sensors, from the mobile master to the second master.

31. A method of operating a mobile master for control of and data collection from a plurality of sensors in a wireless network, the method comprising:
- detecting via a detector, a broadcast request signal from a second master configured for control and data collection of a plurality of sensors in a network, and determining a quality of the broadcast signal from a second master;
- depending on the quality of the request signal, initiating handover of control and data collection for the plurality of sensors, from the second master to the access device based on a result of the detection.

32. A method of operating a second master for control of and controlling data collection from a plurality of sensors of a wireless sensor network, the method comprising:
- detecting via a receiver, a handover request signal from a mobile master which controls and collects data from a mobile plurality of sensors in a wireless network;
- depending on the quality of the handover request signal indicating proximity, signaling via a transmitter, a handover reply to the handover request signal from the mobile master, the handover reply indicating a timing at which control and data collection is to be handed over from the mobile master to the second master.

* * * * *